(12) United States Patent
Xie et al.

(10) Patent No.: US 8,257,859 B2
(45) Date of Patent: Sep. 4, 2012

(54) BATTERY COVER LATCHING MECHANISM

(75) Inventors: Bu-Fan Xie, Shenzhen (CN); Zhen-Lin Liu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 279 days.

(21) Appl. No.: 12/795,056

(22) Filed: Jun. 7, 2010

(65) Prior Publication Data

US 2011/0159333 A1 Jun. 30, 2011

(30) Foreign Application Priority Data

Dec. 30, 2009 (CL) .......................... 2009 1 0312749

(51) Int. Cl.
*H01M 6/42* (2006.01)
*H05K 5/00* (2006.01)
*B65H 1/00* (2006.01)

(52) U.S. Cl. .................. 429/151; 429/163; 361/679.01; 221/282

(58) Field of Classification Search ......................... None
See application file for complete search history.

(56) References Cited

U.S. PATENT DOCUMENTS 7,309,253 B2 * 12/2007 Ge et al. ........................ 439/500

* cited by examiner

*Primary Examiner* — Cynthia Lee
(74) *Attorney, Agent, or Firm* — Altis Law Group, Inc.

(57) ABSTRACT

A battery cover latching mechanism includes a housing member, a cover, and a latching assembly. The cover is detachably assembled to the housing member, and the latching assembly is mounted on the housing member and the cover. The cover includes two positioning blocks, and the latching assembly defines two latching holes located at opposite sides of the latching assembly. The positioning blocks are received within or removed out from the latching holes to lock or unlock the cover, respectively. Thus, the battery cover latching mechanism has simple structure and is easy to operate.

16 Claims, 7 Drawing Sheets

BATTERY COVER LATCHING MECHANISM

BACKGROUND

1. Technical Field

The disclosure generally relates to battery cover latching mechanisms, and more particularly relates, to a battery cover latching mechanism used in a portable electronic device.

2. Description of the Related Art

Batteries are widely used in portable electronic devices, such as personal digital assistants (PDAs), and mobile phones, to provide power to them. To secure more stable electrical connections, batteries are latched within a housing of the portable electronic device.

A typical battery cover latching assembly usually includes two hooks at one end of the battery cover and a locking pin protruding from other end of the battery cover. The housing defines two grooves and a locking hole. In assembly, the hooks are inserted into the grooves, and the battery cover is pressed down towards the housing until the locking pin is inserted into the locking hole. Thus, the battery cover is detachably assembled to the housing the latching assembly. However, removal of the batter cover may require a strong force, which may damage the locking pin, making it inconvenient to install or remove the battery.

Therefore, there is room for improvement within the art.

BRIEF DESCRIPTION OF THE DRAWINGS

Many aspects of an exemplary battery cover latching mechanism can be better understood with reference to the following drawings. The components in the drawings are not necessarily drawn to scale, the emphasis instead being placed upon clearly illustrating the principles of the exemplary battery cover latching mechanism. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
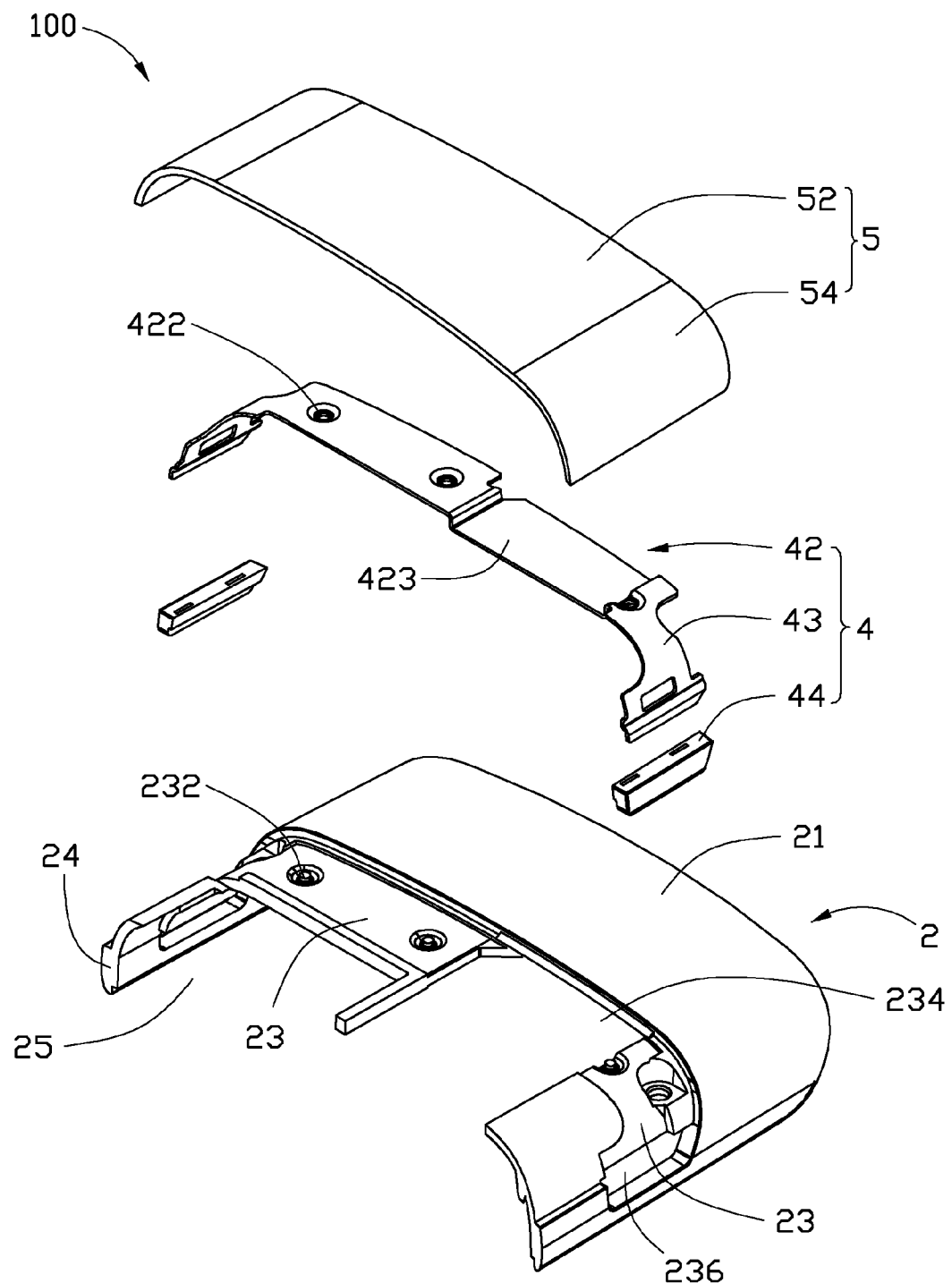
FIG. 1 is an exploded view of a battery cover latching mechanism including a housing member, a latching assembly, and a cover, according to an exemplary embodiment.
Figure 2:
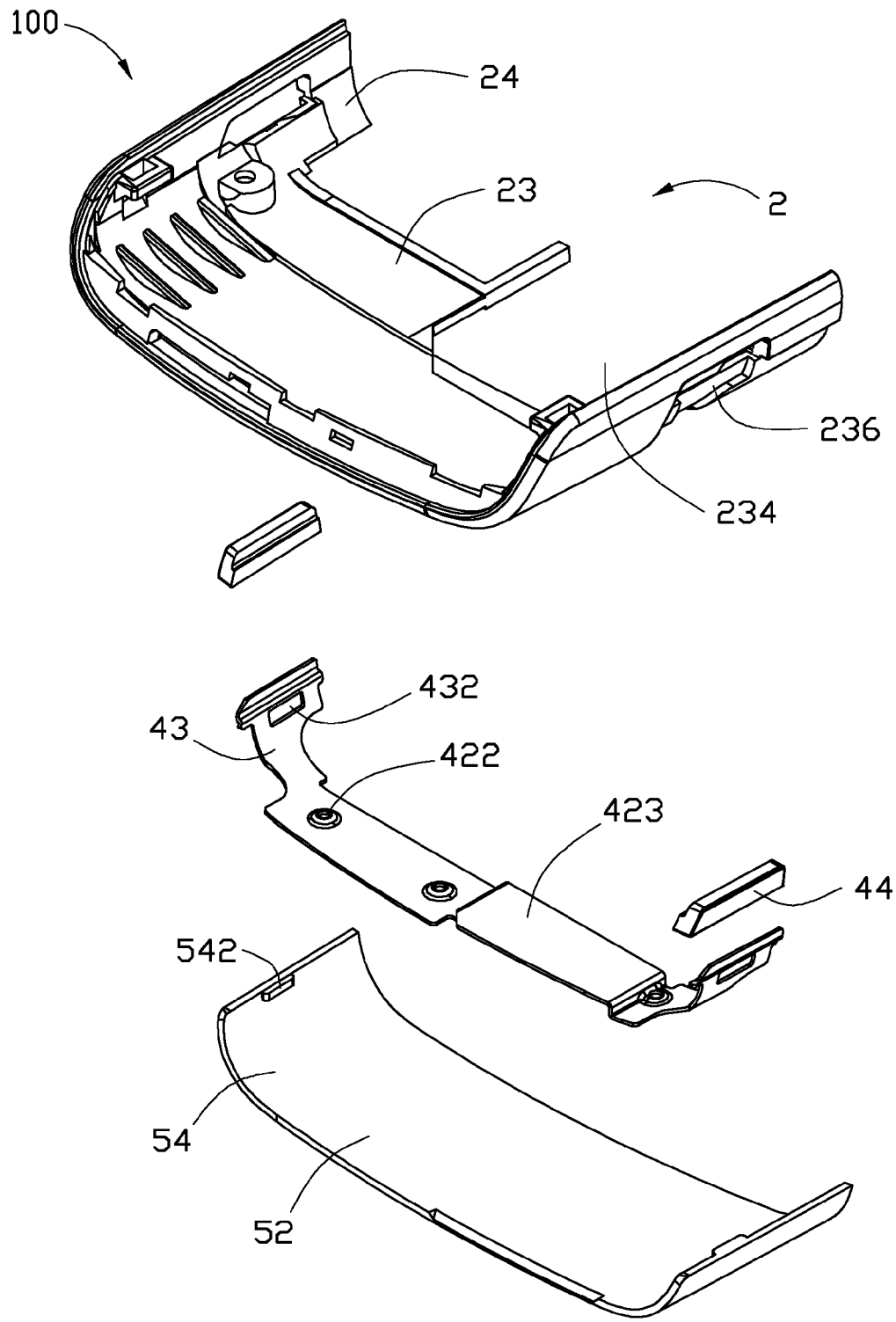
FIG. 2 is similar to FIG. 1 but viewed from another aspect.

Referring to the drawings, FIGS. 1 and 2 show an exemplary embodiment of a battery cover latching mechanism 100 used in a portable electronic device (not shown), which may be a PDA, or a mobile phone. The mobile phone is used here as an example, for the purpose of describing the details of the battery cover latching mechanism 100. The battery cover latching mechanism 100 includes a housing member 2, a latching assembly 4, and a cover 5. The latching assembly 4 is mounted on the housing member 2. The latching assembly 4 is positioned between the housing member 2 and the cover 5 to secure a battery within the housing member 2 and provide latching and unlatching of the cover 5 relative to the housing member 2.

The housing member 2 can be a part of a housing of the portable electronic device. The housing member 2 is substantially a frame and includes a main section 21, an assembling section 23, and two frame sections 24. The assembling section 23 is recessed from the surface of the main section 21 and is for mounting the latching assembly 4 thereon. The assembling section 23 includes a plurality of protrusions 232 perpendicularly protruding from the surface of the assembling section 23. The protrusions 232 may have a variety of different shapes.

A portion of the assembling section 23 defines an opening 234. The assembling section 23 also defines two positioning holes 236 located at opposite sides of the assembling section 23. The positioning holes 236 are opposite to each other and are matchable with the latching assembly 4 to latch/unlatch the cover 5.

Figure 3:
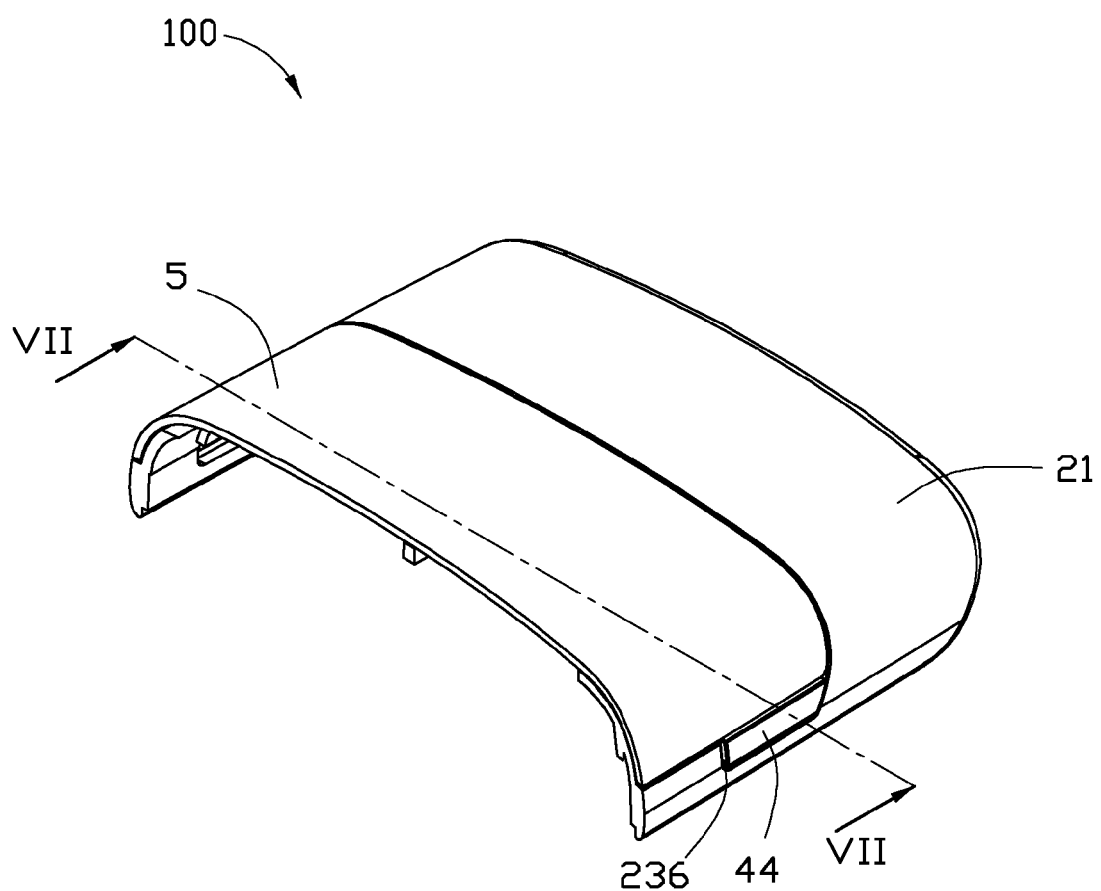
FIG. 3 is an assembled view of the battery cover latching mechanism shown in FIG. 1.
Figure 4:
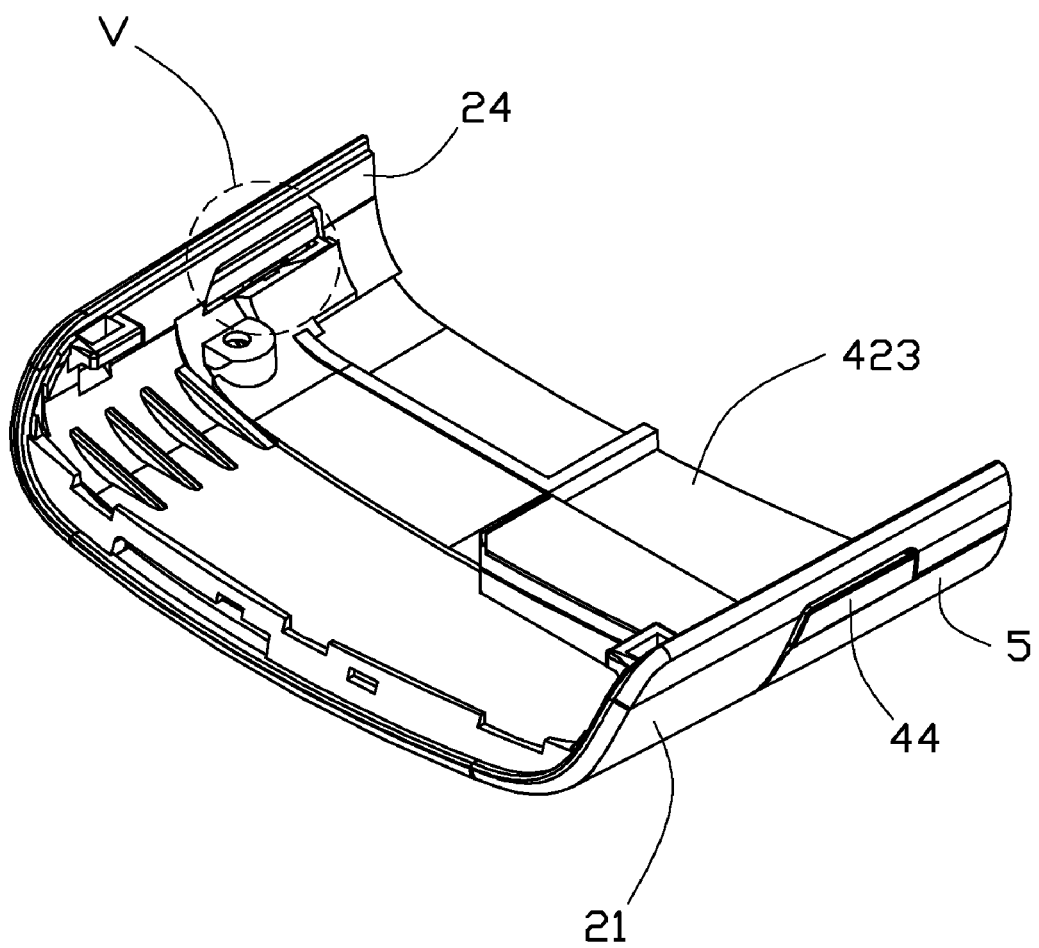
FIG. 4 is similar to FIG. 3, but shown from another aspect.

Also referring to FIGS. 3 and 4, the two frame sections 24 can be formed by deforming the opposite sides of the main section 21 toward the same direction. The two frame sections 24 extend from the opposite sides of the assembling section 23 and are connected to the assembling section 23 and the main section 21 to form a receiving space 25. The receiving hole 25 is capable of receiving the battery.

Figure 5:
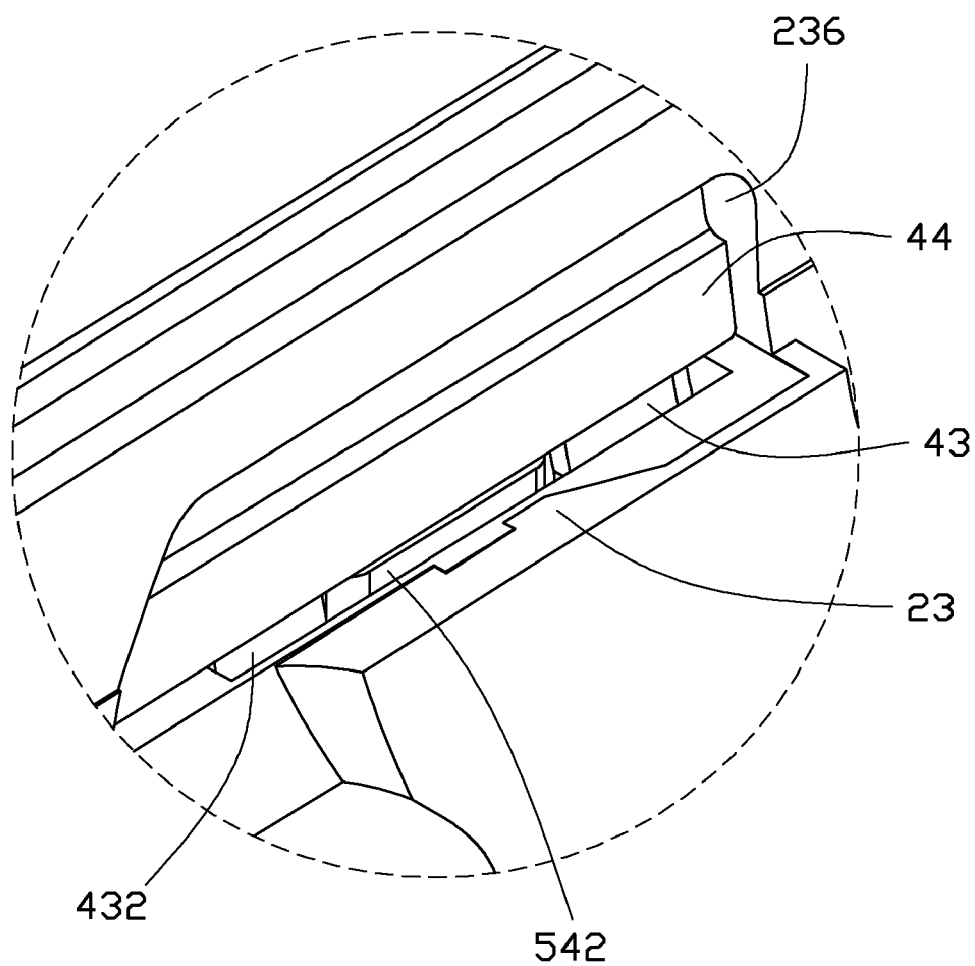
FIG. 5 is an enlarged view of a circled portion V of the battery cover latching mechanism shown in FIG. 4.
Figure 6:
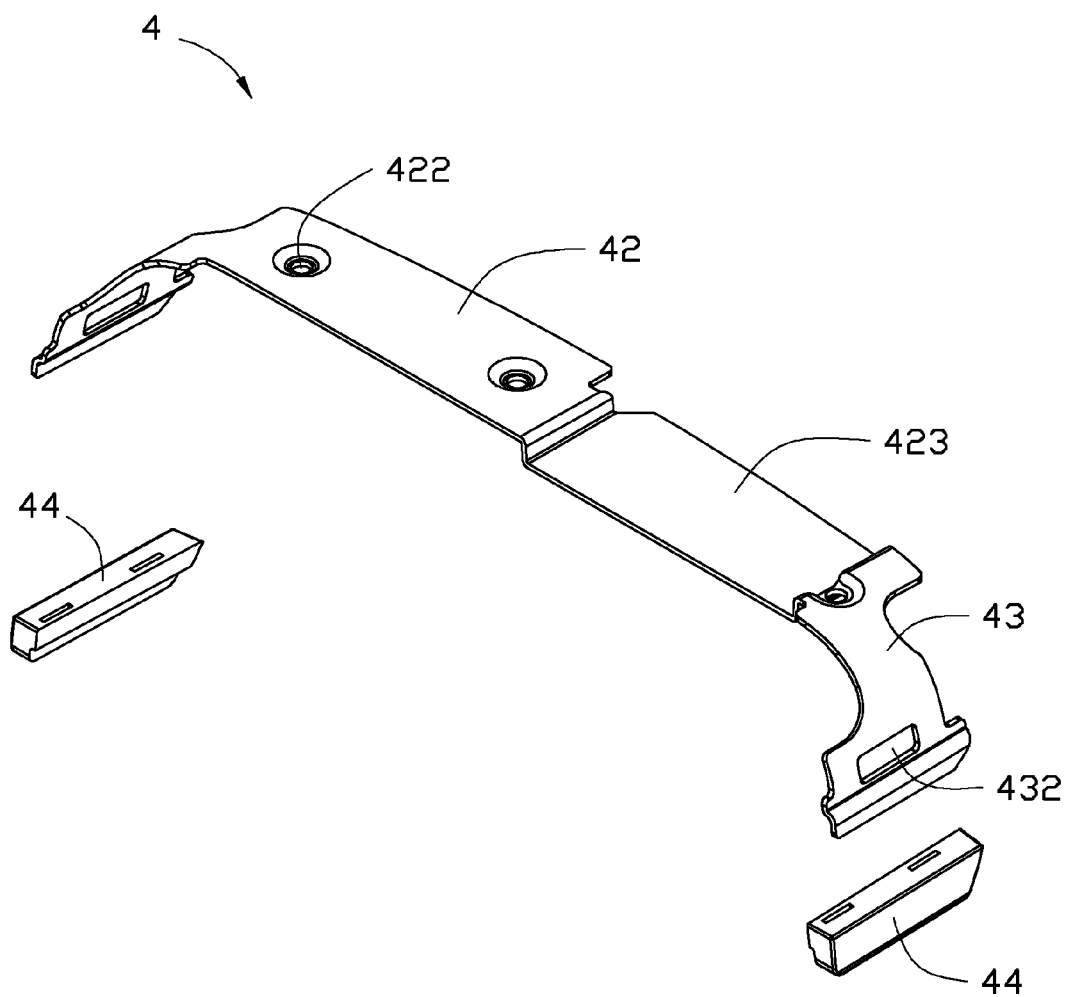
FIG. 6 is an enlarged view of the latching assembly of the battery cover latching mechanism shown in FIG. 1.

Further referring to FIGS. 5 and 6, the latching assembly 4 is made to have a shape that substantially matches the external contour of the assembling section 23. The latching assembly 4 includes a main body 42, two elastic arms 43 connected to the opposite ends of the main body 42, and two operating sections 44 respectively connected to the two elastic arms 43. The main body 42 and the elastic arms 43 can be made from stainless steel, copper or other metal and formed by punching and/or deforming a piece of metal.

The main body 42 defines a plurality of fixing holes 422, whose number and shape correspond with the number and the shape of the protrusions 232. As described below, when the latching assembly 4 is assembled to the housing member 2, the protrusions 232 are inserted into and are fixed within the corresponding fixing holes 422 to secure the main body 42 to the housing member 2. The main body 42 includes a connection section 423. The connection section 423 is recessed from part of the main body 42 and is matchable with the opening 234. When the connection section 423 is received within the opening 234, the opposite sidewalls of the connection section 423 are deformable to resist against the opening 234, which can increase the combination forces between the main body 42 and the assembling section 23, making the main body 42 capable of being more firmly assembled to the housing member 2.

The two elastic arms 43 are formed by deforming the opposite ends of the main body 42. The two elastic arms 43 are located at the same side of the main body 42 and each elastic arm 43 defines a latching hole 432 located at the distal end of the elastic arm 43.

The operating sections 44 may be made from plastic or other elastic material and formed by punching and/or cutting a piece of plastic, and their shapes are matchable with the positioning holes 236. The operating sections 44 can be releasably received in the corresponding positioning holes 236. The distal ends of the elastic arms 43 can be installed in the corresponding operating sections 44 through hot-melt, insert molding or other methods. When the latching assembly 4 is assembled to the housing member 2, the main body 42 is matchably mounted in the assembling section 23. Accordingly, there is an interval between the elastic arms 43 and the assembling section 23 to press the operating sections 44 toward the positioning holes 236.

The cover 5 can be a battery cover of the portable electronic device and includes a sheet body 52 and two sidewalls 54 connected opposite sides of the sheet body 52. The sheet body 52 is substantially flat and the outer surface of the sidewalls 54 can be substantially arcuate. Each sidewall 54 includes a positioning block 542 protruding from the inner surface of the sidewall 54. The locations of the positioning blocks 542 correspond to the locations of the latching holes 432, so that the positioning blocks 542 can be moved in/out from the corresponding latching holes 432 to lock/unlock the cover 5. The cover 5 may also include a locking member, a rotating shaft or other latching mechanism to assemble the housing member 2.

Figure 7:
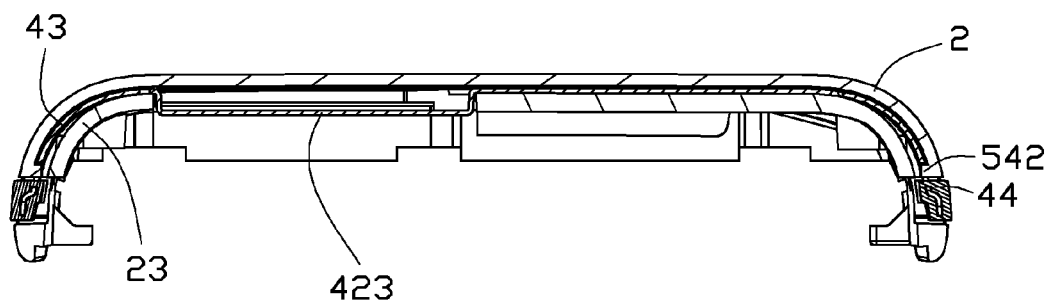
FIG. 7 is an assembled cross-sectional view taken along line VII-VII of FIG. 3, showing the cover assembled to the housing member.

Referring to FIGS. 5, 6 and 7, in assembly, the fixing holes 422 are aligned with the corresponding protrusions 232 of the assembling section 23, and then the protrusions 232 are fixed in the fixing holes 422 via hot-melt or other fixing method. The battery is received within the receiving space 25, the connection section 423 is resistibly received within the opening 234, and the main body 42 is mounted on the assembling section 23. The two elastic arms 43 are spaced with the assembling section 23 by a distance larger than a distance of the positioning blocks 542 sliding in the latching holes 432.

To attach the cover 5 to the housing member 2, the cover 5 is assembled to the housing member 2 through the locking member or the optional rotating shaft. The sheet body 52 contacts the main body 42 and the elastic arms 43 resist against the sidewalls 54. By pressing the cover 5 toward the assembling section 23, the elastic arms 43 are deformed until the positioning blocks 542 are latched within the corresponding latching holes 432, respectively, and the two operating sections 44 are received within the corresponding positioning holes 236, respectively. Thereby, the cover 5 is latched to the housing member 2.

To unlock the cover 5 from the housing member 2, by pressing the two operating sections 44 toward the positioning holes 236, respectively, the elastic arms 43 generate elastic deformations. Due to the interval distance between the elastic arms 43 and the assembling section 23 is larger than the distance of the positioning blocks 542 sliding in the latching holes 432. Therefore, the positioning blocks 542 accordingly detach from the corresponding latching holes 432 respectively, and the two elastic arms 43 automatically restore the initial shape and force the cover 5 upwardly. Thereby, the cover 5 detaches from the housing member 2.

In summary, the battery cover latching mechanism 100 of the exemplary embodiment, by externally pressing the cover 5 and deforming the elastic arms 43 of the latching assembly 4, the cover 5 can be attached/detached from the housing member 2 by operating the latching assembly 4. Moreover, the battery cover latching mechanism 100 has simple structure and is easy to operate.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A battery cover latching mechanism, comprising:
   a housing member;
   a cover detachably assembled to the housing member, the cover comprising two positioning blocks and two sidewalls, each positioning block protruding from an inner surface of the corresponding sidewall; and
   a latching assembly mounted on the housing member and the cover, the latching assembly defining two latching holes at opposite sides of the latching assembly, wherein the positioning blocks are received in or removed out from the latching holes to lock or unlock the cover, respectively.

2. The battery cover latching mechanism as claimed in claim 1, wherein the latching assembly comprises two elastic arms and two operating sections respectively connected to the elastic arms, the housing member comprises an assembling section for mounting the latching assembly, and the elastic arms are spaced with the assembling section by an interval distance, and the interval distance is larger than a distance of the positioning blocks sliding in the latching holes.

3. The battery cover latching mechanism as claimed in claim 2, wherein the assembling section recesses from the surface of the housing member and defines two positioning holes, and the positioning holes correspond to the operating sections and are capable of receiving the operating sections.

4. The battery cover latching mechanism as claimed in claim 3, wherein the latching assembly further comprises a main body, the elastic arms are connected to the opposite ends of the main body, the elastic arms generate elastic deformation when the operating sections are operated, and the positioning blocks detach from the corresponding latching holes to unlock the cover.

5. The battery cover latching mechanism as claimed in claim 4, wherein the main body defines a plurality of fixing holes, the assembling section includes a plurality of protrusions protruding from the surface of the assembling section, the number and the shape correspond with the number and the shape of the protrusions, and the protrusions are received within the fixing holes to assemble the latching assembly to the housing member.

6. The battery cover latching mechanism as claimed in claim 4, wherein the assembling section defines an opening, the main body comprises a connection section recessed from part of the main body, and the connection section is received within the opening and resist against the opening to increase combination forces between the main body and the assembling section.

7. The battery cover latching mechanism as claimed in claim 4, wherein the main body and the elastic arms are made from elastic metal.

8. The battery cover latching mechanism as claimed in claim 1, wherein the cover comprises a sheet body, the two sidewalls are connected opposite sides of the sheet body, the location of the positioning blocks corresponds to the location of the latching holes, and the positioning blocks releasably move in or out from the latching holes to lock or unlock the cover, respectively.

9. A battery cover latching mechanism, comprising:
   a housing member;
   a cover detachably assembled to the housing member, the cover comprising two positioning blocks, the positioning blocks for latching or unlatching the cover to the housing member; and
   a latching assembly mounted on the housing member and the cover, the latching assembly comprising two elastic arms, and each elastic arm defining a latching hole, wherein the elastic arms are capable of deforming when operated, the positioning blocks are selectively latched in or removed out from the corresponding latching holes to lock or unlock the cover, respectively.

10. The battery cover latching mechanism as claimed in claim 9, wherein the latching assembly comprises two operating sections respectively connected to the elastic arms, the housing member comprises an assembling section for mounting the latching assembly, and the elastic arms are spaced with the assembling section by an interval distance, and the interval distance is larger than a distance of the positioning blocks sliding in the latching holes.

11. The battery cover latching mechanism as claimed in claim 10, wherein the assembling section recesses from the surface of the housing member and defines two positioning holes, and the positioning holes correspond to the operating sections and are capable of receiving the operating sections to lock the cover.

12. The battery cover latching mechanism as claimed in claim 11, wherein the latching assembly further comprises a main body, the elastic arm are connected to the opposite ends of the main body, the elastic arms generate elastic deformation when the operating sections are operated, the positioning blocks then detach from the corresponding latching holes to unlock the cover, and the elastic arms restore elastic deformation to force the cover upwardly.

13. The battery cover latching mechanism as claimed in claim 12, wherein the main body defines a plurality of fixing holes, the assembling section includes a plurality of protrusions protruding from the surface of the assembling section, the number and the shape correspond with the number and the shape of the protrusions, and the protrusions are received within the fixing holes to assemble the latching assembly to the housing member.

14. The battery cover latching mechanism as claimed in claim 12, wherein the assembling section defines an opening, the main body comprises a connection section recessed from part of the main body, and the connection section is received within the opening and resist against the opening to increase combination forces between the main body and the assembling section.

15. The battery cover latching mechanism as claimed in claim 12, wherein the main body and the elastic arms are made from elastic metal.

16. The battery cover latching mechanism as claimed in claim 9, wherein the cover comprises a sheet body and two sidewalls connected opposite sides of the sheet body, the positioning block protrudes from the inner surface of the sidewalls respectively, the location of the positioning blocks correspond to the location of the latching holes, and the positioning blocks releasably move in or out from the latching holes to lock or unlock the cover, respectively.

* * * * *